Aug. 11, 1959　　B. F. WEHMER　　2,899,506

MAGNETIC BELT RECORDER

Filed Feb. 13, 1956　　2 Sheets-Sheet 1

INVENTOR.
Bruno F. Wehmer,
BY Brown, Jackson,
Boettcher & Dienner
Attys.

Aug. 11, 1959 B. F. WEHMER 2,899,506

MAGNETIC BELT RECORDER

Filed Feb. 13, 1956 2 Sheets-Sheet 2

INVENTOR.
Bruno F. Wehmer,
BY Brown, Jackson,
Boettcher & Dienner
Attys.

2,899,506

MAGNETIC BELT RECORDER

Bruno F. Wehmer, Park Ridge, Ill., assignor to Charles P. Peirce, Chicago, Ill.

Application February 13, 1956, Serial No. 564,930
4 Claims. (Cl. 179—100.2)

This invention relates generally to dictation equipment and more particularly to a magnetic recorder employing an endless belt type recording medium.

In the dictation equipment industry, marked advances have taken place in recent years whereby dictation equipment has been vastly improved and made more efficient, reliable and convenient to the user. One line of endeavor for improving this type of equipment, has evolved around the effort to make the equipment more compact without sacrificing reliability of operation and function. This trend toward compactness has led to the now familiar desk size dictation machines particularly characterized by the belt type recording medium employed therewith. Constant effort has been expended in compacting such devices, but heretofore a miniature or pocket size addition of the dictation machine has been unknown.

Briefly, my present invention is directed to improvements in structural combinations for a belt type of dictation machine, particularly of the magnetic belt variety, whereby I am able to achieve a miniature or pocket size unit without impairing its ability to reproduce vocal transmissions for dictation purposes. The unit, though extremely small and compact, is nevertheless characterized by reproductive functioning of high fidelity and clarity and is distinguished by its extremely efficient organization of elements and simplicity. In this regard, it will be recognized from descriptive materials which follow hereinafter, that the improved combination of elements and their organization readily lend themselves to a pocket size dictating machine by embodying new concepts for arranging the sound reproductive means relative to the reproductive belt or recording medium and improved means for driving the recording belt or medium across the reproductive sound head.

The main object of this invention is to provide a new magnetic recording machine of miniature and compact size.

Another object of this invention is to provide a new and improved organization of elements and parts in a magnetic recording device whereby the same may be more compactly arranged to present a compact magnetic recorder without impairing operational function and reproductive facility.

A still another object of this invention is to provide a new combination of elements in a magnetic belt recording machine whereby the construction of the device is greatly simplified to bring about economies in production and manufacture without sacrificing the ability of the device to efficiently reproduce and record vocal transmissions.

The above and further objects, features and advantages of this device will become apparent to those familiar in the art from the following detailed description of a preferred embodiment thereof illustrated in the accompanying drawings.

Figure 3:
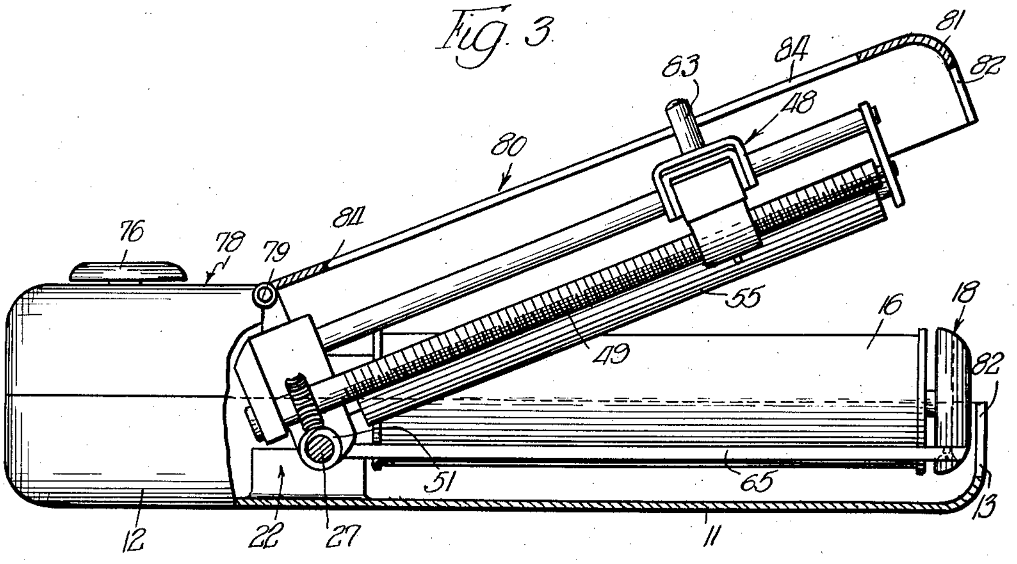
Figure 3 is a front elevational view with parts thereof broken away in cross-section substantially at line 3, 3 of Figure 1.

The recording device indicated generally at 10 in the drawings, comprises, a base plate 11 forming the bottom wall of a half shell casing including two side and two end walls 12 and 13, respectively, as best shown in Figure 3 of the drawings.

Figures 1, 2:
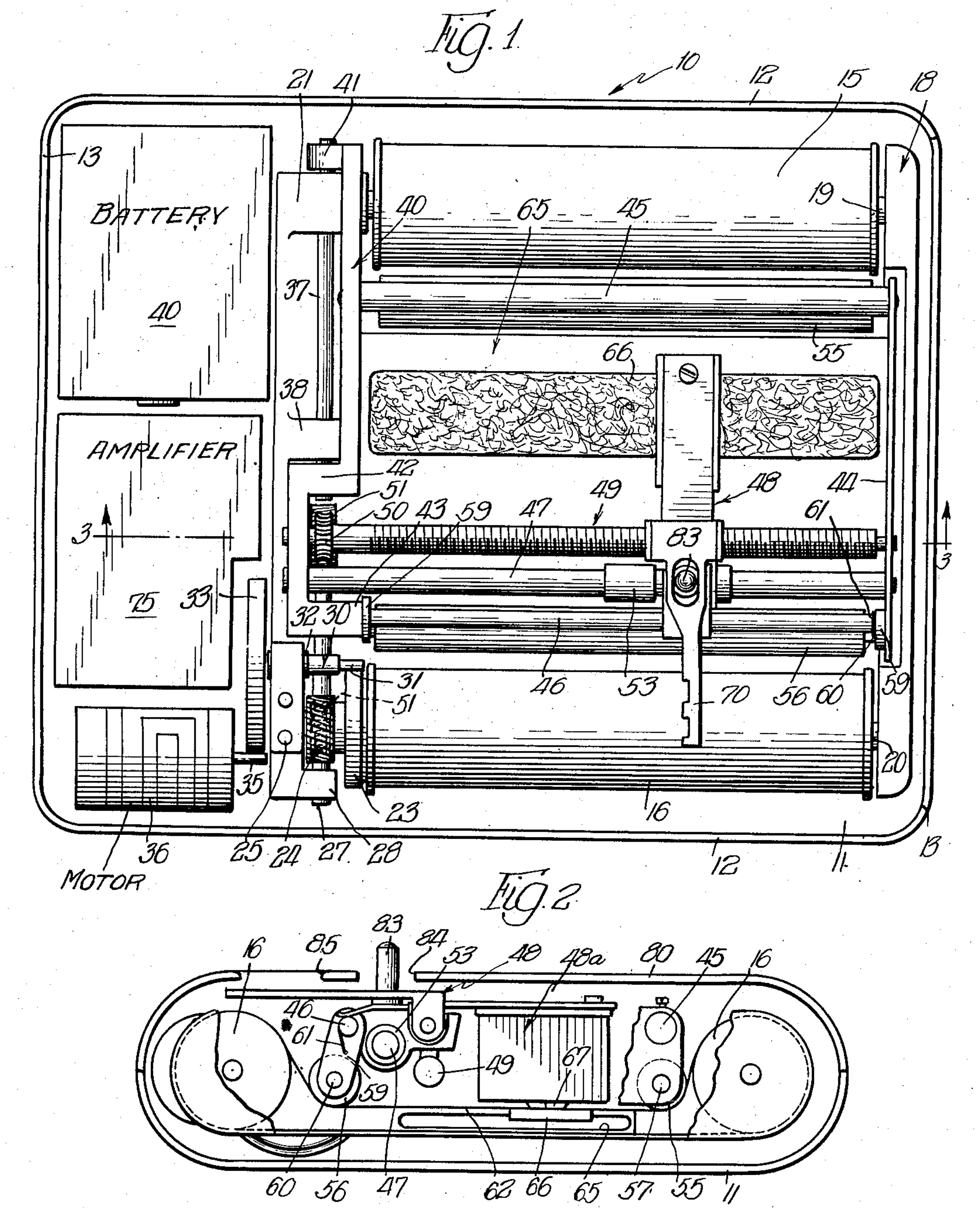
Figure 1 is a top plan view of the improved miniature magnetic recorder of this invention showing the organization of elements and parts as the same appears with the protective outer cover therefor removed.
Figure 2 is an end elevational view of the device shown in Figure 1 with parts thereof broken away in section to more readily demonstrate the internal arrangement of elements employed therein.

Located and mounted within the area bounded by the walls 12 and 13 and on the base plate 11 are a pair of parallel spaced rollers 15 and 16 comprising identical metal cylinders. Such rollers 15 and 16 are held in parallel spaced relationship at one end by a bearing plate member 18 which includes bearing means (not shown) for receiving the outer ends of shafts 19 and 20 associated with the cylinders 15 and 16, respectively. As best shown in Figure 1, the bearing plate member 18 extends outwardly of and between the corresponding ends of the two cylinders 15 and 16. The inner end of shaft 19 is received in a bearing block 21 formed as an integral extension or projection of a base support 22 fastened securely to the base plate 11. This latter relationship may best be understood by viewing Figure 3 of the drawings. The cylinder 15 comprises an idler roller which is rotatable with shaft 19 whereas cylinder 16 is a driven cylinder or roller.

To accomplish the rotational driving of cylinder 16, the innermost end thereof is equipped with a friction disk 23 mounted coaxially with the cylinder and comprising hard rubber or the like. Shaft 20, beyond the friction disk 23, supports a worm gear 24 and the extreme inner end of shaft 20 is housed in bearing means carried in a bearing block extension or portion 25 of the base support 22. The worm gear 24 engages an underlying worm 26 mounted on a drive shaft 27 disposed transversely with respect to shafts 19 and 20. Shaft 27 is supported at one end by an ear extension or portion 28 of the support 22 which contains bearing means to permit rotation of the shaft 27 in response to rotation of cylinder 16 and drive disk 23.

In order to rotatably drive disk 23, the bearing block 25 supports a drive shaft 30 having a reduced portion 31 at one end which engages the periphery of the drive disk 23. The shaft 30 is supported in bearing sleeve 32 held in the block member 25 and supports a second drive disk of larger diameter than disk 23 at its inner end beyond the block 25. The second drive disk 33 is engaged at its periphery by the armature shaft 35 of a miniature motor 36 which, for example, may comprise a 10 volt D.C. motor having permanent magnetic field members. The motor is powered from a battery indicated generally at 40, as shown in Figure 1 of the drawings.

It will be understood that rotation of the armature shaft 35 serves to frictionally drive the disk 33 to rotate shaft 30 and the drive disk 23 which is associated with the driven cylinder 16. Driving of the cylinder 16 serves to rotate the worm gear 24 fixed to its supporting shaft 20, which in turn imparts rotational motion to the transversely related shaft 27 by virtue of its engagement with the worm 26.

A pivot shaft 37 coaxially aligned with shaft 27 is carried between block 21 and ear projection 38 of base block 22 to support a bracket 40 having extensions 41, 42 and 43 disposed generally transverse to the bracket's longitudinal axis. Extensions 41 and 42 pivot about shaft 37 while ear 43 serves as an intermediate support for the drive shaft 27. The bracket 40 is pivotal about shaft 27 for purposes which will appear presently. Bracket 40 lies between the inner ends of cylinders 15 and 16 and shafts 27 and 37, and is paralleled by a bracket plate 44 disposed adjacent the outer ends of cylinders 15 and 16, as best shown in Figure 1. A pair of rods 45 and 46 extend in spaced parallelism substantially between opposite ends of bracket 40 and bracket plate 44, and intermediate the two cylinders 15 and 16. Such rods serve to interconnect the bracket 40 and bracket plate 44 in a rigid manner. A third guide rod 47 is likewise disposed transversely between the bracket 40 and bracket plate 44, such rod serving as a guide means for a carriage assembly 48 supporting a magnetic pickup unit 48*a*. A lead screw 49 is rotatably mounted between the bracket 40 and bracket plate 44; such lead screw carrying a worm gear 50 adjacent its inner end for meshing engagement with a worm 51 mounted on shaft 27.

It will thus be appreciated that rotational driving of shaft 27 in turn, serves to rotatably drive the lead screw 49. The carriage assembly 48 is suitably engaged with the lead screw 49, according to conventional and known practice, whereby such is advanced along the length of the screw 49 in response to rotation of the latter member. The guide rod 47 bears a sliding guide sleeve 53 associated with carriage assembly 48, thereby giving the magnetic pickup support during its traverse along the lead screw 49.

A pair of rollers 55 and 56 are also mounted between the bracket 40 and bracket plate 44; roller 55 being disposed on a fixed shaft 57 directly beneath the rod member 45 adjacent cylinder 15. Roller 56, on the other hand, is suspended by a pair of links or arms 59, 59 from the rod member 46; such links 59 being pivotal about the stationary rod 46 with the roller 56 rotating about its shaft 60. A spring means 61, located adjacent the outer end of rod 46, acts on a link 59 to bias the roller 56 toward the driven cylinder 16. With this arrangement, a recording belt 62, comprising a magnetic recording medium, may be placed over the rollers or cylinders 15 and 16 and guided beneath the guide rollers 55 and 56; the latter roller serving as a means for tensioning the belt due to the influence of spring means 61.

In so mounting the belt 62, as best shown in Figure 2 of the drawings, it will be noted that a plate member 65 is disposed intermediate the upper and lower runs of the belt; such plate 65 carrying a felt pad 66 (see Figure 1) of sufficient dimension to extend beneath the full width of the belt member 62. The pad 66 is located directly beneath the path of travel for magnetic pickup stylus 67 of the head assembly 48*a* to support the upper run of the belt during the recording operation. The plate 65 is suitably supported in cantilever fashion on the base support means 22.

From the foregoing, it will be recognized that the entire carriage assembly 48, the pickup 48*a*, support rods 45 and 46, shaft 47, lead screw 49, etc. are designed to pivot as a unit about shaft 37 with the bracket 40 and bracket plate 44. This pivotal action is brought into play when it is desired to either mount or remove a belt 62.

The arrangement of the elements for the sound head and traversing carriage assembly, intermediate or in between the two belt carrying cylinders 15 and 16 so that the pickup 67 lies within the spacing defined between such two cylinders or that is, invades the spacing defined between two planes passed through upper and lower tangent points of the two cylinders 15 and 16, produces a surprisingly compact and effective structure. It further should be noted that contrary to the normal arrangement for a magnetic recorder of the belt variety, location of the sound head between the two cylinders 15 and 16 permits the stylus to work against a stationary resilient platen or cushion such as the felt pad 66. This arrangement appears to be far more satisfactory than having the pickup ride over the movable hard surface of one of the belt supporting cylinders 15 or 16, for example, and greatly promotes reduction of size without impairing function of the recording device.

Figure 4:
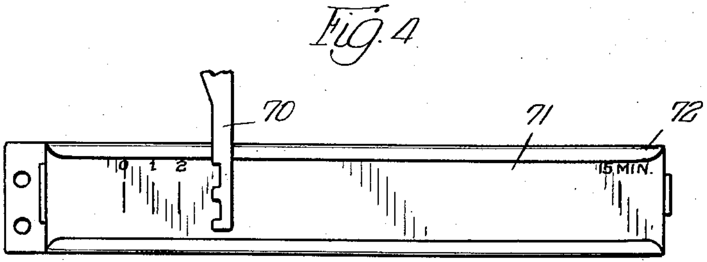
Figure 4 is a partial top plan view of an index system employed in the recorder of Figure 1 to indicate the position of travel for the sound head along the belt type recording medium employed therewith.

With further regard to the carriage assembly 48, it will be understood that the same includes a pointer 70 which works in conjunction with an indicator scale 71 mounted on a scale holder 72, as shown in Figure 4 especially. Scale holder 72 is attached to the bearing block 25 substantially in cantilever fashion above cylinder 16.

In order to facilitate suitable control of the voice transmission, an amplifier unit, indicated generally at 75, is included; such comprising according to present electronic design a battery powered transistor circuit for compactness. Volume control, operable by a knob or dial means 76, is associated with the amplifier; such amplifier including suitable jack means (not shown) for receiving a connection with a microphone or other suitable transmitting means capable of receiving and delivering the voice of the dictator or operator to the sound head.

An upper housing, indicated generally by numeral 78, is matched in contour and configuration with the lower housing portion to encase the internal structure previously described hereinabove. It should be noted, in particular, that the upper housing 78 is broken and provided with a transversely extending pivot or hinge means 79 to form a cover 80 which may be swung upwardly prior to displacing the sound head unit for purposes of loading a belt onto the cylinders 15 and 16, as previously related. The outer or right hand walls 81 and 13, as viewed in Figure 3, of the upper and lower housing portions, respectively, are provided with an elongated opening 82 for clearing the recording belt 62 when loading and removing the same. Note, that when loading the belt onto cylinders 15 and 16, the same is slipped or passed over the bearing bracket member 18 onto the cylinders 15 and 16. It will be understood, regarding the loading of the recording belt 62, that the upper run thereof passes above the plate 65 and the felt pad 66 while the lower run of the belt passes between such plate and the base wall 11 of the lower housing.

In order to permit play-back of previously recorded dictation and to permit the operator to place the recording head at desired locations across the width of the recording belt, the carriage and attached pickup assemblies 48 and 48*a* pivot about the axis of guide rod 47 by grasping a control knob 83 which extends upwardly through an elongated slotted opening 84 in the cover portion 80. Knob 83 projects above the upper wall of the housing during all periods of operation and passes along the length of the slotted opening 84 therein. A window opening 85, in the upper housing 78, parallels slot 84 for observation of the index scale 71.

From the foregoing description and specifications, it is believed that those familiar with the art will readily recognize and appreciate the marked advancement and improvement of my present invention especially as to arrangement of elements which permits compact assembly in my improved magnetic belt recorder.

Of particular importance is the disposition of the recording head intermediate the two guide cylinders 15 and 16 and its invasion of the spacing between such cylinders. It is largely due to the placement of the recording head intermediate the belt supporting cylinders 15 and 16 that the recording stylus thereof is permitted to work in conjunction with the resilient pad 66 and supporting plate 65 to bring about an improved and simplified arrangement of elements for a recorder of this general class.

It is also to be understood that while I have herein shown and described my invention in relation to a particular preferred embodiment thereof as hereinabove described and as set forth in the accompanying drawings, nevertheless numerous changes, modifications and substitutions of equivalents may be made therein without necessarily departing from the spirit and scope of this invention. For example, while the device has been illustrated as a portable type powered from a battery electrical source, it is fully contemplated that normal power supply sources such as 110 or 115 volts A.C. or D.C. may likewise be employed either as a sole source of electrical energy or in conjunction with a portable battery power source as illustrated. Therefore, it is not my intention to be limited to the particular aspects and details of structure described and set forth in the accompaying drawings, except as may appear in the following appended claims.

I claim:

1. A magnetic recorder employing an endless recording belt, comprising, a base, a pair of belt supporting cylinders, means mounting said cylinders for rotation on parallel spaced axes and supporting the same in cantilever fashion over said base, a recording belt being mounted on said cylinders by slipping the same axially over the unsupported ends thereof, drive means for rotatably driving one of said cylinders, a support member extending between said cylinders in spaced parallelism to said base and adapted to project between the runs of a belt mounted on said cylinders, magnetic pickup means movable over said belt, lead screw means driven by said drive means and having driving connection with said pickup means for moving the latter between said cylinders and parallel to their longitudinal axes, bracket means supporting said lead screw means and said pickup means, and means pivotally mounting said bracket means on said base for movement thereof about an axis transverse to the longitudinal axes of said cylinders and adjacent the outer free ends thereof whereby the said magnetic pickup and lead screw means may be pivotally swung simultaneously by said bracket means toward and away from said support member to operatively engage and disengage said pickup means and a belt mounted on said cylinders.

2. A magnetic recorder employing an endless recording belt, comprising, a base, a pair of belt supporting cylinders mounted on said base in cantilever fashion, said cylinders being adapted to support an endless recording belt therebetween, drive means for rotating one of said cylinders to motivate said belt means when the latter is tensioned over said cylinders, support means extending between the upper and lower runs of the belt and intermediate said cylinders, roller means adapted to engage the upper run of said belt for tensioning the latter and for holding said upper run thereof in superposed adjacency to said support means, a magnetic pickup means adapted to be disposed in the spacing between said cylinders and between parallel planes passing tangent to the upper and lower diametrical limits of said cylinders, said pickup means engaging said belt over said support plate, lead screw means rotated by said drive means and having driving connection with said pickup means for moving the latter in a regulated manner across said belt, and means pivotally supporting said pickup means so that the same may be moved about a common axis with said roller means and said lead screw means toward and away from said belt.

3. In a magnetic recording device employing an endless belt recording medium, the combination comprising, a base, a pair of belt supporting cylinders supported in spaced parallelism over said base, drive means for rotatably driving said cylinders, a shaft means transverse to the rotational axes of said cylinders and rotatably driven therewith, said cylinders being adapted to support an endless recording belt therebetween, magnetic pickup means engageable with the upper run of said belt at a point intermediate said cylinders, lead screw means having connection with said pickup means for traversing the same over the width of said belt in a regulated manner, bracket means pivotally connected to said shaft and supporting said pickup and lead screw means whereby the same may be pivotally moved about said shaft to engage and disengage said pickup means with the said upper run, and additional means pivotally supporting said pickup means for engaging and disengaging the same with said lead screw means.

4. In a magnetic recording device employing an endless recording belt, the combination comprising, a support base, a pair of belt supporting cylinders mounted on said base and extending in spaced parallelism thereover, an endless recording belt being mounted on said cylinders by applying the same loosely over the free unsupported ends thereof so that said belt may be tensioned therebetween with substantially parallel upper and lower runs, means for rotatably driving one of said cylinders to motivate said belt, shaft means mounted transversely to the rotational axes of said cylinders and rotatably driven by said one cylinder, magnetic pickup means adapted to be disposed in the spacing between said cylinders for engaging the exterior face of the upper run of a recording belt mounted therebetween, lead screw means rotatably driven by said shaft means and having detachable driving connection with said pickup means, said lead screw means serving to move said pickup means across the width of said belt in a regulated manner, roller means for tensioning said belt, and bracket means supporting said pickup means, its said lead screw means and the said tensioning roller means, said bracket means pivoting about said shaft whereby the said pickup means may be moved with said tensioning roller and said lead screw means toward and away from said belt, and additional means providing pivotal movement of said pickup means toward and away from said lead screw means for their selective connection and disconnection.

References Cited in the file of this patent

UNITED STATES PATENTS

| | | |
|---|---|---|
| 2,318,828 | Yerkovich | May 11, 1943 |
| 2,603,721 | Camras | July 15, 1952 |
| 2,702,710 | Conrad | Feb. 22, 1955 |
| 2,706,118 | Camras | Apr. 12, 1955 |
| 2,782,041 | Muller | Feb. 19, 1957 |